United States Patent
Choi et al.

(10) Patent No.: US 10,680,214 B2
(45) Date of Patent: Jun. 9, 2020

(54) TRAY FOR ACTIVATING BATTERY CELL COMPRISING ELASTIC MEMBER

(71) Applicant: LG Chem, Ltd., Seoul (KR)

(72) Inventors: Eun Seok Choi, Daejeon (KR); In Gu An, Daejeon (KR); Jae Han Jung, Daejeon (KR)

(73) Assignee: LG CHEM, LTD., Seoul (KR)

(*) Notice: Subject to any disclaimer, the term of this patent is extended or adjusted under 35 U.S.C. 154(b) by 110 days.

(21) Appl. No.: 15/866,953

(22) Filed: Jan. 10, 2018

(65) Prior Publication Data
US 2018/0198102 A1 Jul. 12, 2018

(30) Foreign Application Priority Data
Jan. 11, 2017 (KR) .................. 10-2017-0004042

(51) Int. Cl.
| | | |
|---|---|---|
| *H01M 2/10* | (2006.01) | |
| *H01M 10/04* | (2006.01) | |
| *H01M 2/02* | (2006.01) | |
| *H01M 10/44* | (2006.01) | |
| *H02J 7/00* | (2006.01) | |

(52) U.S. Cl.
CPC ....... *H01M 2/1061* (2013.01); *H01M 10/049* (2013.01); *H01M 10/0481* (2013.01); *H01M 10/446* (2013.01); *H02J 7/0045* (2013.01); *H01M 2/021* (2013.01);
(Continued)

(58) Field of Classification Search
CPC ......... H01M 10/02; H01M 10/04–049; H01M 2/10–1094; H01M 2/02–0295
See application file for complete search history.

(56) References Cited

U.S. PATENT DOCUMENTS 5,766,801 A * 6/1998 Inoue .................. H01M 2/0245
429/159
6,087,036 A * 7/2000 Rouillard .............. H01M 2/202
429/120
(Continued)

FOREIGN PATENT DOCUMENTS

KR 1998-0009768 U 4/1998
KR 20060063174 A * 6/2006
(Continued)

OTHER PUBLICATIONS

Machine translation of Kim (KR-20060063174-A) (Year: 2006).*

*Primary Examiner* — Jonathan G Leong
*Assistant Examiner* — Jacob Buchanan
(74) *Attorney, Agent, or Firm* — Birch, Stewart, Kolasch & Birch, LLP (57) ABSTRACT

The present disclosure provides a battery cell activation tray which is an activation tray configured to accommodate battery cells during an activation process of the battery cells and has a structure including a base plate having a plate-type structure in which a plurality of battery cells are located on an upper surface thereof and a supporting portion of a partition wall structure protruding at one end in an upper surface direction, a plurality of jigs located on the upper surface of the base plate and separated from each other at a predetermined interval, and one or more elastic members mounted on the jigs to adjust separation distances between the jigs by elasticity, at both of opposite outer peripheral portions.

13 Claims, 3 Drawing Sheets

(52) U.S. Cl.
CPC ........ *H01M 2/0212* (2013.01); *H01M 2/0217* (2013.01); *H01M 2220/30* (2013.01); *H02J 7/0013* (2013.01)

(56) References Cited

U.S. PATENT DOCUMENTS

| | | | |
|---|---|---|---|
| 2007/0037051 A1* | 2/2007 | Kim | H01M 2/1016 429/151 |
| 2011/0177377 A1* | 7/2011 | Dube | H01M 2/0207 429/153 |
| 2014/0087231 A1* | 3/2014 | Schaefer | H01M 2/1072 429/120 |
| 2014/0356664 A1* | 12/2014 | Jung | H01M 2/1077 429/82 |
| 2016/0133892 A1* | 5/2016 | Uhm | H01M 2/1022 429/163 |
| 2019/0044113 A1* | 2/2019 | Wagner | H01M 2/1061 |

FOREIGN PATENT DOCUMENTS

| | | |
|---|---|---|
| KR | 2013-0010735 A | 1/2013 |
| KR | 10-1482042 B1 | 1/2015 |
| KR | 2016-0004661 A1 | 1/2016 |
| WO | WO-2015012520 A1 * | 1/2015 .......... H01M 2/1022 |
| WO | WO-2017133856 A1 * | 8/2017 .......... H01M 2/1061 |

\* cited by examiner

TRAY FOR ACTIVATING BATTERY CELL COMPRISING ELASTIC MEMBER

CROSS-REFERENCE TO RELATED APPLICATION

This application claims priority to Korean Patent Application No. 10-2017-0004042 filed on Jan. 11, 2017, the contents of which are incorporated by reference in their entirety.

TECHNICAL FIELD

The present disclosure relates to a tray for activating a battery cell including an elastic member.

RELATED ART

Depletion of fossil fuel has brought about a great increase in the price of energy sources and increased interest in environmental pollution. Eco-friendly alternative energy sources are a necessity for the next generation. In this regard, a great deal of research into power production methods such methods of producing as nuclear energy, solar power, wind power, and tidal power is underway, and a power storage device for efficiently utilizing the produced energy is also attracting much attention.

Particularly, as mobile devices have been increasingly developed and the demand for such mobile devices has increased, the demand for secondary batteries has also sharply increased as an energy source for the mobile devices. Accordingly, much research into batteries satisfying various needs has been carried out.

In terms of the shape of batteries, the demand for prismatic secondary batteries or pouch-shaped secondary batteries which are thin enough to be applied to products, such as mobile phones, is very high. In terms of the material for batteries, the demand for lithium secondary batteries, such as lithium ion batteries and lithium ion polymer batteries, exhibiting high energy density, discharge voltage, and output stability is very high.

Further, the secondary battery may be classified according to a structure of an electrode assembly having a structure in which a positive electrode, a negative electrode, and a separator interposed between the positive electrode and the negative electrode are laminated. Typical examples are a jelly-roll type (wound type) electrode assembly having a structure in which long sheet-like positive electrodes and negative electrodes are wound with a separator interposed therebetween, and a stack type (laminated type) electrode assembly in which a large number of positive electrodes and negative electrodes cut in units of a predetermined size are sequentially laminated with a separator interposed therebetween. Recently, in order to solve problems of the jelly-roll type electrode assembly and the stack type electrode assembly, a stacked/folded type electrode assembly having a structure in which unit cells in which a predetermined unit of positive electrodes and negative electrodes are laminated with a separator interposed therebetween are positioned on the separator and are sequentially wound has been developed, as an electrode assembly having an advanced structure that is a mixed type of the jelly-roll type and the stack type.

Based on a shape of a battery case, the secondary battery is classified into a cylindrical type battery and a prismatic type battery in which an electrode assembly is housed in a cylindrical or prismatic metal can and a pouch type battery in which an electrode assembly is embedded in a pouch shaped case made of an aluminum laminate sheet.

In particular, a pouch-shaped battery having a structure in which a stacked or stacked/folded type electrode assembly is embedded in a pouch-shaped battery case of an aluminum laminate sheet has recently attracted much attention due to its low manufacturing cost, light weight, ease of shape customization, and the like, and its usage is gradually increasing.

Figure 1:
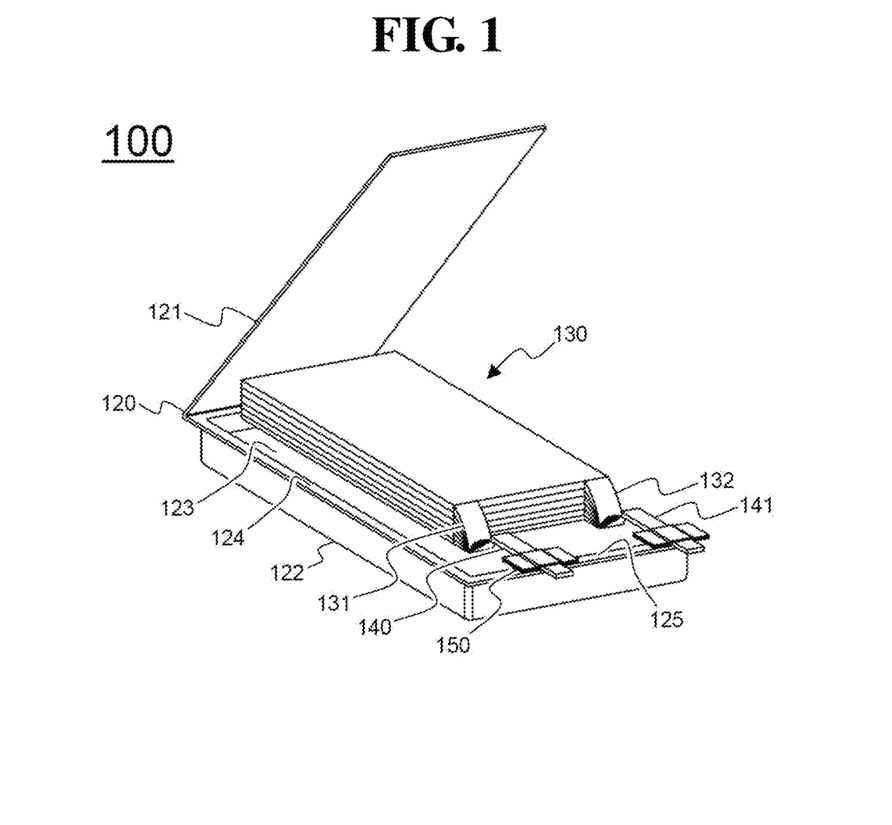
FIG. 1 is a perspective view schematically showing a structure of a conventional pouch-shaped battery cell.

FIG. 1 is a perspective view schematically showing a structure of a conventional pouch-shaped battery cell.

Referring to FIG. 1, a pouch-shaped battery cell 100 includes an electrode assembly 130, electrode tabs 131 and 132 extending from the electrode assembly 130, electrode leads 140 and 141 welded to the electrode tabs 131 and 132, and a battery case 120 that accommodates the electrode assembly 130.

The electrode assembly 130 is an electricity generating element in which a positive electrode and a negative electrode are sequentially laminated with a separator interposed therebetween, and has a stacked or stacked/folded type structure. Each of the electrode tabs 131 and 132 is extended from each electrode plate of the electrode assembly 130, and the electrode leads 140 and 141 are electrically connected to the plurality of electrode tabs 131 and 132 which are extended from the electrode plates, respectively, for example, by welding. Here, a part of each of the electrode leads 140 and 141 is exposed to the outside of the battery case 120. Further, insulating films 150 are attached to parts of upper and lower surfaces of the electrode leads 140 and 141 to simultaneously increase a degree of sealing with the battery case 120 and secure an electrical insulation state.

The battery case 120 includes a body 122 having a concave shaped storage 123 in which the electrode assembly 130 may be seated and a cover 121 integrally connected to the body 122, and a battery is manufactured by bonding side portions 124 and an upper end portion 125, which are contact parts, in a state in which the electrode assembly 130 is accommodated in the storage 123. The battery case 120 is made of an aluminum laminate structure of a resin outer layer/a metal layer with barrier properties/a heat-meltable resin sealant layer, and forms a sealing surplus portion in which the cover 121, and the side portions 124 and the upper end portion 125 of the body 122 which are in contact with each other are bonded by applying heat and pressure thereto to fuse the resin layers. The side portions 124 may be uniformly sealed by melting because the same resin layers of the upper and lower battery case 120 are in direct contact therewith. On the other hand, since the protruding electrode leads 140 and 141 are placed on the upper end portion 125, heat fusing is performed in a state in which the insulating film 150 is interposed between the upper end portion 125 and the electrode leads 140 and 141 to improve sealing in consideration of a thickness of the electrode leads 140 and 141 and heterogeneity with the material of the battery case 120.

Generally, a pouch-shaped battery cell having such a structure is manufactured through various processes such as a process of preparing a primary battery cell having a structure in which an electrode assembly and an electrolyte are housed together in a battery case, an aging process for the primary battery cell, an activation process of charging/discharging the primary battery cell, and a degassing process of removing gases generated during the aging process and the charging/discharging process.

Here, the activation process is performed by connecting a charging and discharging device to positive and negative electrode terminals of a battery cell in a state in which the battery cell is accommodated in a battery cell activation tray having a storage which is divided by a partition wall to accommodate the battery cell.

Figure 2:
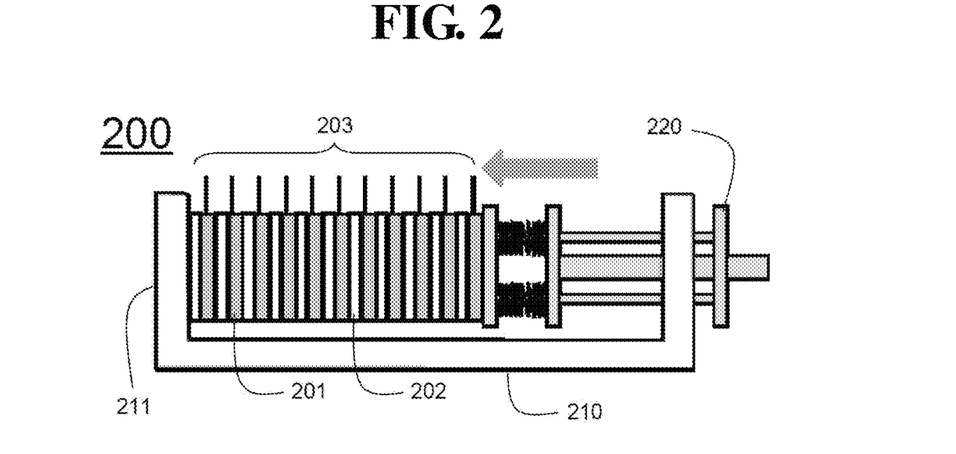
FIG. 2 is a schematic view schematically showing a structure of a conventional battery cell activation tray.

FIG. 2 is a schematic view schematically showing a structure of a conventional battery cell activation tray.

Referring to FIG. 2, a plurality of battery cells 201 are stacked and arranged with jigs 202 interposed therebetween to form a battery cell stack 203, and the battery cell stack 203 is arranged on a base plate 210 having a plate-type structure.

A supporting portion 211 having a partition wall structure protruding upward is formed at one end portion of the base plate 210 to support the battery cell stack 203.

A pressing portion 220 is located at the other end portion opposite the supporting portion 211 and presses the battery cell stack 203 in a direction of the supporting portion 211 to prevent shape deformation that may occur in the activation process of the battery cell 201.

However, the conventional battery cell activation tray requires that each of battery cells and jigs are sequentially stacked and arranged, and a battery cell stack is transferred to a base plate which has a pressing portion, and thus excessive time is consumed to configure the battery cell activation tray.

Furthermore, since a stacked arrangement of the battery cells and jigs is transferred to the base plate without the stacked arrangement being stably fixed, the above-mentioned transfer process is very cumbersome and it is impossible to effectively prevent damage to the battery cells which may occur during such a transfer process.

Therefore, there is a great need for a technology that can fundamentally solve such problems.

SUMMARY

The present disclosure is provided to solve the above-described problems of the related art and technical problems which have been identified in the past.

The inventors of the present application have completed the present disclosure after having conducted intense research and various experiments and having confirmed that, as will be described below, since a battery cell activation tray includes one or more elastic members mounted on jigs at both of opposite outer peripheral portions thereof, a cost of manufacturing the battery cell activation tray may be saved because separation distances between the jigs are adjusted by the elastic members so that there is no need for an additional member such as a pressing portion configured to prevent shape deformation that may occur during an activation process of battery cells, and a time and cost required for manufacturing battery cells may be effectively saved because a battery cell stack can be maintained in a stably stacked state by the elastic members, and thus it is not necessary to transfer the battery cell stack to a separate tray or apparatus on which the battery cell stack may be located, and accordingly, a time required in the above-described process can be saved, and damage to the battery cells, which may occur in the above-described process, can be prevented.

According to an aspect of the present disclosure, there is provided a battery cell activation tray which is an activation tray configured to accommodate battery cells during an activation process of the battery cells and may have a structure including: a base plate having a plate-type structure in which a plurality of battery cells are located on an upper surface thereof and one end portion including a supporting portion of a partition wall structure protruding in an upper surface direction; a plurality of jigs located on the upper surface of the base plate and separated from each other at a predetermined interval; and one or more elastic members mounted on the jigs to adjust separation distances between the jigs by elasticity, at both of opposite outer peripheral portions.

Accordingly, a cost of manufacturing the battery cell activation tray may be saved because the separation distances between the jigs are adjusted by the elastic members so that there is no need for an additional member such as a pressing portion configured to prevent shape deformation that may occur during an activation process of the battery cells, and a time and cost required for manufacturing battery cells may be effectively saved because a battery cell stack can be maintained in a stably stacked state by the elastic members, and thus it is not necessary to transfer the battery cell stack to a separate tray or apparatus on which the battery cell stack may be located, and accordingly, a time required in the above-described process can be saved, and damage to the battery cells, which may occur in the above-described process, can be prevented.

BRIEF DESCRIPTION OF THE DRAWINGS

The following drawings attached to the specification illustrate exemplary examples of the present disclosure and serve to enable technical concepts of the present disclosure to be further understood together with detailed description of the disclosure given below, and therefore the present disclosure is not to be interpreted only with the matters in such drawings.

DETAILED DESCRIPTION

The inventors of the present application have completed the present disclosure after having conducted intense research and various experiments and having confirmed that, as will be described below, since a battery cell activation tray includes one or more elastic members mounted on jigs at both of opposite outer peripheral portions, a cost of manufacturing the battery cell activation tray may be saved because separation distances between the jigs are adjusted by the elastic members so that there is no need for an additional member such as a pressing portion configured to prevent shape deformation that may occur during an activation process of battery cells, and a time and cost required for manufacturing battery cells may be effectively saved because a battery cell stack can be maintained in a stably stacked state by the elastic members, and thus it is not necessary to transfer the battery cell stack to a separate tray or apparatus on which the battery cell stack may be located, and accordingly, a time required in the above-described process can be saved, and damage to the battery cells, which may occur in the above-described process, can be prevented.

According to an aspect of the present disclosure, there is provided a battery cell activation tray which is an activation tray configured to accommodate battery cells during an activation process of the battery cells and may have a structure including: a base plate having a plate-type structure in which a plurality of battery cells are located on an upper surface thereof and a supporting portion of a partition wall structure protruding at one end in an upper surface direction; a plurality of jigs located on the upper surface of the base plate and separated from each other at a predetermined interval; and one or more elastic members mounted on the jigs to adjust separation distances between the jigs by elasticity, at both of opposite outer peripheral portions.

Accordingly, a cost of manufacturing the battery cell activation tray may be saved because the separation distances between the jigs are adjusted by the elastic members so that there is no need for an additional member such as a pressing portion configured to prevent shape deformation that may occur during an activation process of the battery cells, and a time and cost required for manufacturing battery cells may be effectively saved because a battery cell stack can be maintained in the stably stacked state by the elastic members, and thus it is not necessary to transfer the battery cell stack to a separate tray or apparatus on which the battery cell stack may be located, and accordingly, a time required in the above-described process can be saved, and damage to the battery cells, which may occur in the above-described process, can be prevented.

In one specific example, the elastic members may have a structure that applies attraction force to the jigs to narrow the separation distance between the jigs.

That is, the elastic members apply an attraction force to the jigs, not a tension, and thus an arrangement state of the battery cell stack may be more easily and stably fixed and maintained during the activation process of the battery cells without needing to press the battery cell stack through a separate pressing portion.

The type of the elastic member is not limited as long as the elastic member is capable of easily applying an attraction force to the jigs to narrow the separation distance between the jigs in a state in which the elastic members are stably mounted on both of the outer peripheral portions of the jigs, and, specifically, the elastic member may be a tensile spring in consideration of durability, ease of handling, economical feasibility, and the like.

Further, the elastic member may have one end mounted on an outer peripheral portion of the supporting portion, and the other end opposite the one end mounted on the outer peripheral portion of the jig located at the outermost position.

Accordingly, by mounting the one end of the elastic member to the outer peripheral portion of the supporting portion which is fixed to the base plate, the attraction force applied from the other end of the elastic member mounted on the outer peripheral portion of the jig located at the outermost position may be effectively applied to all of the jigs with the one end of the elastic member stably fixed to the supporting portion.

In one specific example, the elastic members may have a structure in which two or more elastic members are mounted at separate locations.

More specifically, the elastic members are mounted on the outer peripheral portions of both sides of the jig, and the outer peripheral portions are opposite each other.

Here, two or more elastic members may be mounted on the outer peripheral portion of one side of the jig at separate locations to eliminate or minimize interference therebetween.

In this case, the elastic members may have a structure in which the elastic members are mounted at the outer peripheral portion of the jig at the same height from the upper surface of the base plate.

That is, each of the elastic members mounted on the outer peripheral portions of both of the sides of the jig may be mounted on portions having the same height from the upper surface of the base plate so that the elastic members may be structured to be mounted on opposite portions.

For example, a first elastic member and a second elastic member are mounted on the outer peripheral portion of the one side of the jig at different heights from the upper surface of the base plate and are separated from each other, and a third elastic member and a fourth elastic member are mounted on the outer peripheral portion of the other side of the jig opposite the one side at different heights from the upper surface of the base plate and are separated from each other. In such a case, the first elastic member and the third elastic member may be mounted on both outer peripheral portions opposite each other at the same height from the upper surface of the plate, and the second elastic member and the fourth elastic member respectively mounted at positions separated from the first elastic member and the third elastic member are mounted on both outer peripheral portions opposite each other at the same height from the upper surface of the base plate.

Accordingly, it is possible to prevent a pressure applied to the battery cell from locally concentrating on one portion of the battery cell due to the elasticity of the elastic member.

Further, the elastic member may have a structure which is detachably mounted on the outer peripheral portion of the jig.

Accordingly, the elastic member may be appropriately selected and applied according to a thickness of the battery cell and a desired pressure to be applied to the battery cell by elasticity, and replacement and repair due to wear and damage to the elastic member may be easily performed.

In such a case, the outer peripheral portion of the jig to which the elastic member is mounted may have a structure in which a hook-shaped fixing portion is formed with a circular structure having one open portion so that the elastic member may be fixed thereto.

Accordingly, the elastic member is detachably mounted through the circular open portion of the hook-shaped fixing portion and is not easily detached from the peripheral portion of the jig in a state in which the battery cell stack is fixed, and thus a stably fixed pressing state may be maintained.

Further, an indented-shape groove parallel to an arrangement direction of the jigs may be formed on the upper surface of the base plate, and a jig transferring portion for transferring the jigs along the indented-shape groove may be formed at a lower end of the jig corresponding to the indented-shape groove in a state in which at least a part of the lower end of the jig is seated in the indented-shape groove.

That is, since the jigs are transferred and pressed by the elasticity of the elastic members in a state in which the jig transferring portion is seated in the indented-shape groove formed on the upper surface of the base plate, a phenomenon in which the battery cell stack including the jigs is detached or separated from the upper surface of the base plate may be more easily prevented even when the elastic member mounted on the outer periphery of the one side of the jig is damaged.

In one specific example, the jig transferring portion may be a roller mounted on the lower end portion of the jig corresponding to the indented-shape groove.

Accordingly, the jig may be more easily transferred on the upper surface of the base plate by the jig transferring portion formed of the roller, and loss of a pressing force applied from the elastic members due to friction between the jig and the base plate may be prevented.

In another specific example, the jig transferring portion may be a guide protruding from the lower end of the jig corresponding to the indented-shape groove to be inserted into the indented-shape groove.

Accordingly, since the guide is integrally formed with the jig, the transfer of the jig by the elasticity of the elastic member may be guided on the upper surface of the base plate while better structural stability is exhibited.

Here, a protrusion height of the guide may be 10% to 90% relative to a depth of the indented-shape groove.

When the protrusion height of the guide is less than 10% relative to the depth of the indented-shape groove, the protrusion height of the guide seated in the indented-shape groove is excessively low, and thus the guide may be more easily separated from the indented-shape groove, and accordingly, the jig may not be easily guided while maintaining a stable seating state of the jig relative to the upper surface of the base plate.

On the other hand, when the protrusion height of the guide exceeds 90% relative to the depth of the indented-shape groove, the protrusion height of the guide seated in the indented-shape groove is excessively high, and thus friction caused by the guide may occur in the indented-shape groove and the friction may act as a factor for lowering the pressing force applied by the elasticity of the elastic members, and accordingly, the desired pressing force may not be applied only by the elasticity of the elastic members and the jig may not be easily guided.

Meanwhile, the battery cell may include positive and negative electrode terminals having one side protruding to the outer periphery, and may have a structure in which the positive and negative electrode terminal are accommodated and arranged in the upper surface direction opposite the base plate.

That is, the battery cell may have a structure in which the positive and negative electrode terminals protruding toward the same outer periphery are arranged in the upper surface direction opposite the base plate so that the positive and negative electrode terminals are electrically connected to a charging and discharging device.

Accordingly, the battery cell accommodated in the battery cell activation tray may have a structure in which the activation process is performed with the positive and negative electrode terminals exposed in the upper surface direction to be more easily connected to the charging and discharging device.

Further, a height of the jig corresponding to a protruding direction of the supporting portion may be 50% to 100% relative to a length of the battery cell corresponding to the height of the jig.

When the height of the jig corresponding to the protruding direction of the supporting portion is less than 50% relative to the length of the battery cell corresponding to the height of the jig, an area of the battery cell supported by the jig is decreased such that the battery cell may not be stably supported or fixed using the jig.

On the other hand, when the height of the jig corresponding to the protruding direction of the supporting portion exceeds 100% relative to the length of the battery cell corresponding to the height of the jig, the height of the jig is unnecessarily large and an overall size of the battery cell activation tray is increased such that handling of the jig may not be easy.

Further, a width of the jig perpendicular to the protruding direction of the supporting portion may be 110% to 150% relative to a width of the battery cell corresponding to the width of the jig.

When the width of the jig perpendicular to the protruding direction of the supporting portion is less than 110% relative to the width of the battery cell corresponding to the width of the jig, the elastic members mounted on the outer periphery of both sides of the jig and the outer periphery of both sides of the battery cell may be in contact and interfere with each other, and thus the separation distances between the jigs may not be easily closed by the elasticity of the elastic members.

On the other hand, when the width of the jig perpendicular to the protruding direction of the supporting portion exceeds 150% relative to the width of the battery cell corresponding to the width of the jig, the width of the jig is unnecessarily large and the overall size of the battery cell activation tray is increased such that handling of the jig may not be easy.

Since the remaining structure of the battery cell activation tray other than the above-described configuration and structure is well known in the art, a detailed description thereof will be omitted in this specification.

As described above, since the battery cell activation tray according to the present disclosure includes one or more elastic members mounted on the jigs at both opposite outer peripheral portions of the jigs, the cost of manufacturing the battery cell activation tray may be saved because the separation distances between the jigs are adjusted by the elastic members so that there is no need for an additional member such as a pressing portion configured to prevent shape deformation that may occur in the activation process of the battery cells, and the time and cost required for manufacturing the battery cells may be effectively saved because the battery cell stack can be maintained in the stably stacked state by the elastic members, and thus it is not necessary to transfer the battery cell stack to a separate tray or apparatus on which the battery cell stack may be located, and accordingly, the time required in the above-described process can be saved, and the damage to the battery cells, which may occur in the above-described process, can be prevented.

Hereinafter, exemplary embodiments of the present disclosure will be described in detail with reference to the drawings, and the scope of the present disclosure is not limited thereto.

Figure 3:
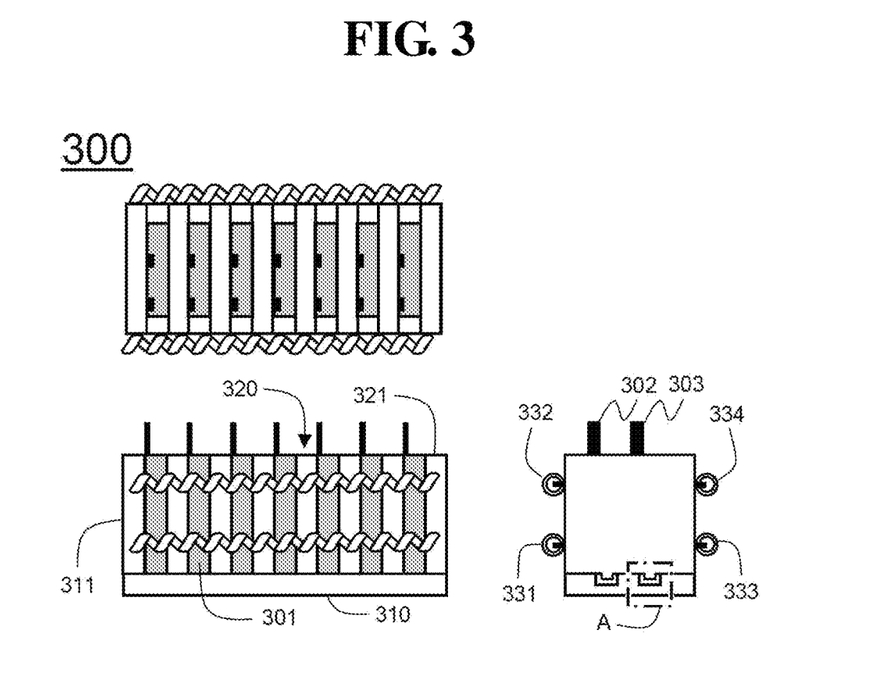
FIG. 3 is a schematic view schematically showing a structure of a battery cell activation tray according to one exemplary embodiment of the present disclosure.

FIG. 3 is a schematic view schematically showing a structure of a battery cell activation tray according to one exemplary embodiment of the present disclosure.

Referring to FIG. 3, a battery cell activation tray 300 includes a base plate 310, a plurality of jigs 320, and elastic members 331, 332, 333, and 334.

A plurality of battery cells 301 and the jigs 320 are alternatingly stacked and arranged on an upper surface of the base plate 310 having a plate-type structure.

A supporting portion 311 having a partition wall structure protruding upwardly is formed at one end of the base plate 310.

The plurality of jigs 320 are separated at predetermined intervals, each of the battery cells 301 is interposed between the jigs 320, and the battery cells 301 are arranged such that positive and negative electrode terminals 302 and 303 of the battery cell 301 are exposed in a direction of an upper surface opposite the base plate 310.

The elastic members 331, 332, 333, and 334 composed of tension springs configured to adjust the separation distances between the jigs 320 are mounted on outer peripheral portions on both sides of the jig 320.

One end portions of the elastic members 331, 332, 333 and 334 are mounted on the outer peripheral portions of the supporting portion 311, and the other end portions opposite the one end portions are mounted on the outer peripheral portion of the jig 321 located at the outermost position.

A first elastic member 331 and a second elastic member 332 are mounted on the outer peripheral portion of one side of the jig 320 separated from each other, and a third elastic member 333 and a fourth elastic member 334 are mounted on the outer peripheral portion of the other side opposite the one side of the jig 320 separated from each other.

The first elastic member 331 and the third elastic member 332 are mounted at positions having the same height from the upper surface of the base plate 310, and the second elastic member 332 and the fourth elastic member 334 are mounted at positions having the same height from the upper surface of the base plate 310.

Accordingly, the elastic members 331, 332, 333, and 334 are mounted on the outer peripheral portions of the both sides of the jig 320, and the outer peripheral portions are opposite each other.

Figure 4:
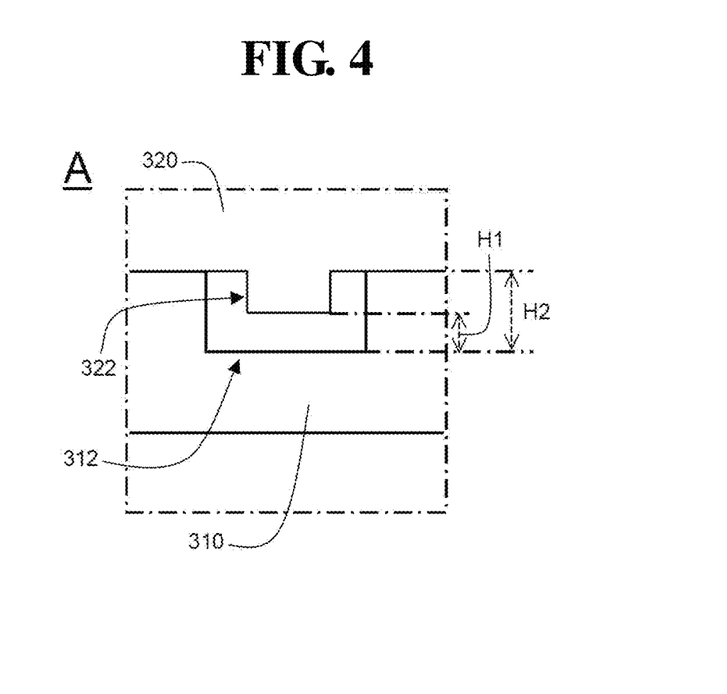
FIG. 4 is an enlarged schematic view showing a structure of part A of FIG. 3.

FIG. 4 is an enlarged schematic view showing a structure of part A of FIG. 3.

Referring to FIG. 4, an indented-shape groove 312 parallel to an arrangement direction of the jigs 320 is formed on the upper surface of the base plate 310, and a guide 322 protruding to be inserted into the indented-shape groove 312 is formed integrally with the jig 320 at a lower end of the jig 320 corresponding to the indented-shape groove 312.

A protrusion height H1 of the guide 322 is about 50% relative to a depth H2 of the indented-shape groove 312.

Accordingly, the guide 322 may more easily guide a transfer of the jig 320 by elasticity of the elastic member on the upper surface of the base plate 310 while minimizing friction with respect to the indented-shape groove 312.

Figure 5:
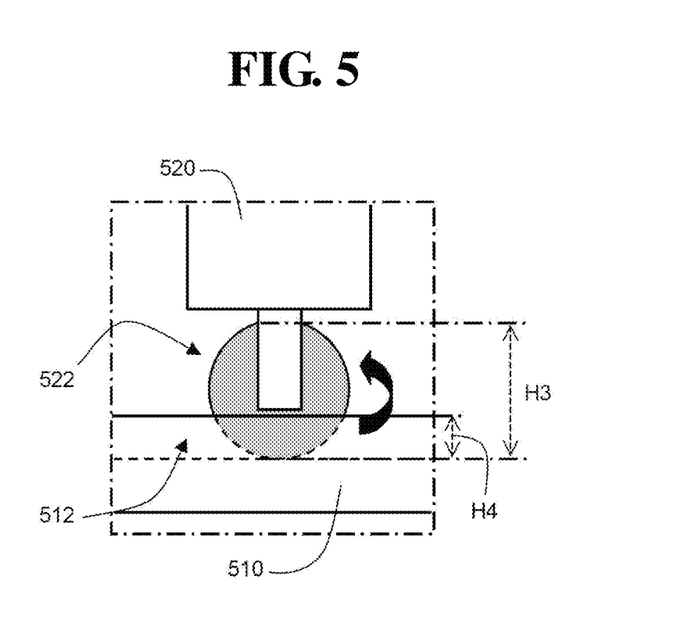
FIG. 5 is an enlarged schematic view showing a side structure of a jig transferring portion of a battery cell activation tray according to another exemplary embodiment of the present disclosure.

FIG. 5 is an enlarged schematic view showing a side structure of a jig transferring portion of a battery cell activation tray according to another exemplary embodiment of the present disclosure.

Referring to FIG. 5, an indented-shape groove 512 is formed on an upper surface of a base plate 510, and a roller 522, as a jig transferring portion, is mounted on a lower end of a jig 520 corresponding to the indented-shape groove 512.

The roller 522 has a diameter of 30% relative to a depth of the indented-shape groove 512, and thus the roller 522 transfers the jig 520 on the upper surface of the base plate 510 by rotating with at least a portion of the roller 522 being seated in the indented-shape groove 512.

Accordingly, the jig 520 may be transferred in a state in which a lower end portion of the jig 520 is separated from the upper surface of the base plate 510, and since the jig 520 is transferred by the rotation of the roller 522, a frictional force generated between the jig 520 and the upper surface of the base plate 510 is minimized such that loss of a pressure applied by elasticity of elastic members may be minimized.

Although the present disclosure has been described with reference to the accompanying drawings according to the embodiments of the present disclosure, it should be understood by those skilled in the art that various changes may be made without departing from the spirit and scope of the present disclosure.

The invention claimed is:

1. A battery cell activation tray which is an activation tray configured to accommodate battery cells during an activation process of the battery cells, comprising:
    a base plate having a plate-type structure in which a plurality of battery cells are located on an upper surface thereof and a supporting portion of a partition wall structure protruding at a first end of the base plate in an upper surface direction;
    a plurality of jigs located on the upper surface of the base plate and separated from each other at a predetermined interval; and
    a first elastic member mounted on a first side of the jigs to adjust separation distances between the jigs by elasticity; and
    a second elastic member mounted on a second side of the jigs opposite the first side to adjust the separation distances between the jigs by elasticity,
    wherein an indented-shape groove parallel to a stacking direction of the jigs is formed on the upper surface of the base plate along a substantially entire length of the base plate,
    wherein a jig transferring portion for transferring the jigs along the indented-shape groove is formed at a lower end of the jig corresponding to the indented-shape groove in a state in which at least a part of the lower end of the jig is seated in the indented-shape groove, and
    wherein at least one of the first elastic member and the second elastic member has a first end mounted on an outer peripheral portion of the supporting portion, and a second end opposite the first end of the at least one of the first elastic member and the second elastic member mounted on an outer peripheral portion of the jig located at a second end of the base plate opposite the first end of the base plate.

2. The battery cell activation tray of claim 1, wherein the first elastic member and the second elastic member apply an attraction force to the jigs to close the separation distance between the jigs.

3. The battery cell activation tray of claim 1, wherein the first elastic member and the second elastic member are tensile springs.

4. The battery cell activation tray of claim 1, wherein the first elastic member and the second elastic member are provided in plurality such that two or more of the first elastic members and two or more of the second elastic members are mounted at separate locations.

5. The battery cell activation tray of claim 4, wherein the first elastic members-and the second elastic members are mounted at the outer peripheral portion of the jigs at the same height from the upper surface of the base plate.

6. The battery cell activation tray of claim 1, wherein the first elastic member and the second elastic member are detachably mounted on the outer peripheral portion of the jigs.

7. The battery cell activation tray of claim 6, wherein the outer peripheral portion of the jig at the second end of the base plate has a hook-shaped fixing portion with a circular structure having one open portion formed to which the at least one of the first elastic member and the second elastic member is fixed.

8. The battery cell activation tray of claim 1, wherein the jig transferring portion is a roller mounted on the lower end portion of the jig corresponding to the indented-shape groove.

9. The battery cell activation tray of claim 1, wherein the jig transferring portion is a guide protruding from the lower end of the jig corresponding to the indented-shape groove to be inserted into the indented-shape groove.

10. The battery cell activation tray of claim 9, wherein a protrusion height of the guide is 10% to 90% relative to a depth of the indented-shape groove.

11. The battery cell activation tray of claim 1, wherein the battery cell includes positive and negative electrode terminals having one side protruding to the outer peripheral portion, and the positive and negative electrode terminals are accommodated and arranged in the upper surface direction opposite the base plate.

12. The battery cell activation tray of claim 1, wherein a height of the jig corresponding to a protruding direction of the supporting portion is 50% to 100% relative to a length of the battery cell corresponding to the height of the jig.

13. The battery cell activation tray of claim 1, wherein a width of the jig perpendicular to the protruding direction of the supporting portion is 110% to 150% relative to a width of the battery cell corresponding to the width of the jig.

* * * * *